United States Patent [19]
McGregor et al.

[11] 3,938,089
[45] Feb. 10, 1976

[54] DOUBLE READ SYSTEM FOR CHARACTER RECOGNITION SYSTEMS

[75] Inventors: Arvin D. McGregor; William E. Holmes, both of Birmingham, Mich.

[73] Assignee: Burroughs Corporation, Detroit, Mich.

[22] Filed: Feb. 25, 1974

[21] Appl. No.: 445,773

[52] U.S. Cl. .................. 340/146.3 D; 340/146.3 C
[51] Int. Cl.² .......................................... G06K 9/00
[58] Field of Search ............. 340/146.3 C, 146.3 D, 146.3 ED; 235/61.11 D

[56] References Cited
UNITED STATES PATENTS

| | | | |
|---|---|---|---|
| 3,764,978 | 10/1973 | Tyburski et al. | 340/146.3 D |
| 3,764,980 | 10/1973 | Dansac et al. | 340/146.3 D |
| 3,895,350 | 7/1975 | DeVries | 340/146.3 D |

FOREIGN PATENTS OR APPLICATIONS

| | | | |
|---|---|---|---|
| 820,283 | 9/1959 | United Kingdom | 340/146.3 D |

*Primary Examiner*—Joseph M. Thesz, Jr.
*Attorney, Agent, or Firm*—G. Gregory Schivley; Michael B. McMurry; Edwin W. Uren

[57] ABSTRACT

An improved character reading system that utilizes two separate read devices: a first read device and a second read device in combination with a random access memory for storing each character read by the first read device, a memory control circuit for writing each character into the random access memory, and a comparison logic circuit for comparing each character as read by the second read device with the corresponding character stored in the random access memory. The system also includes a time-out counter for indicating when the last character has been read and a comparison logic timing circuit for controlling the comparison logic and triggering the random access memory read control circuit so as to provide the corresponding character to the comparison logic.

17 Claims, 7 Drawing Figures

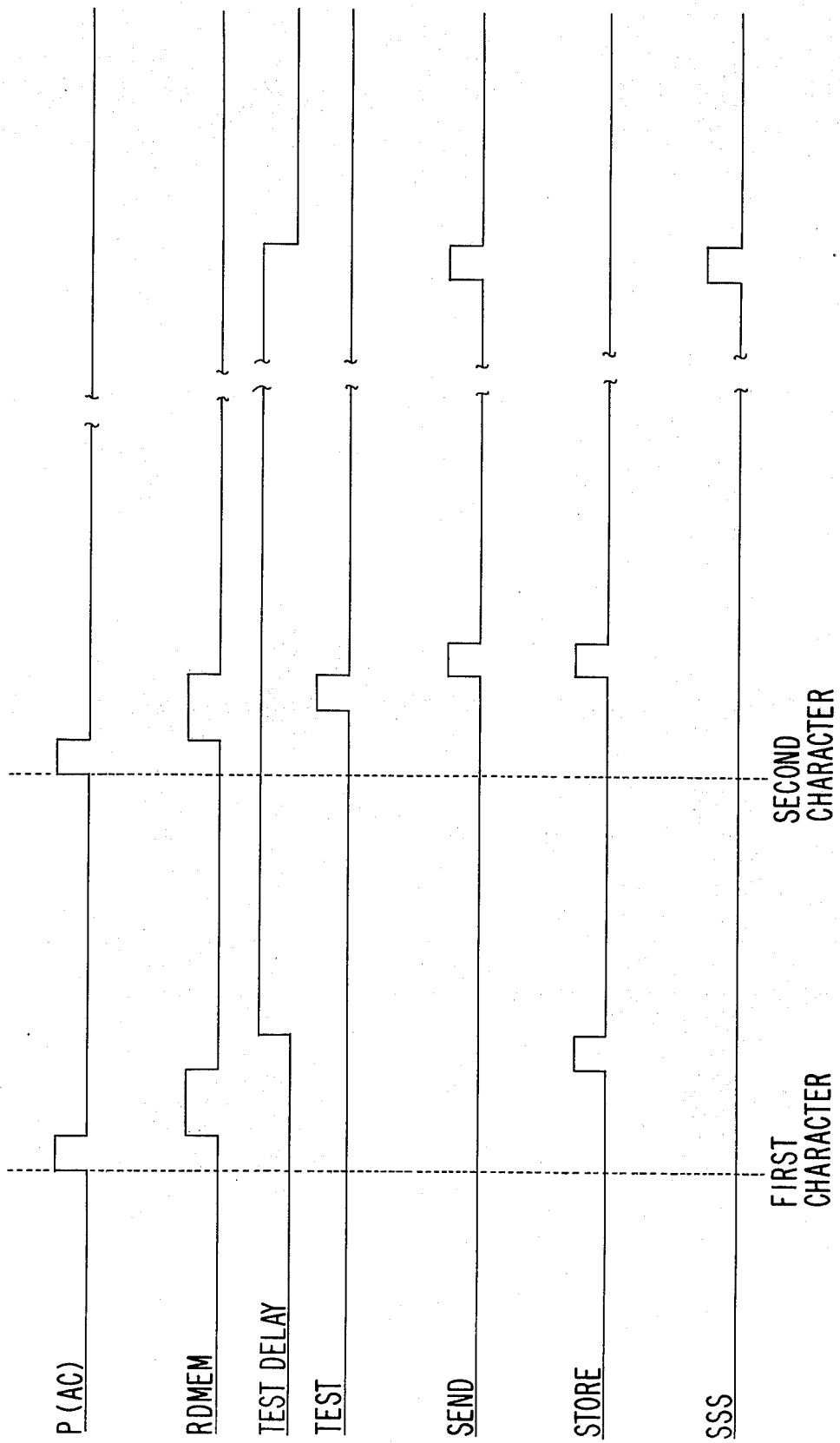

DOUBLE READ SYSTEM FOR CHARACTER RECOGNITION SYSTEMS

BACKGROUND OF THE INVENTION

The field of invention is character recognition systems and more particularly magnetic ink character recognition systems for reading documents wherein the characters are printed with magnetic ink.

The prior art devices utilized for reading documents printed with magnetic ink used, for the most part, a single read head for reading the magnetically encoded character. Most typically utilized, in more recent types of equipment, is the alternating current type of read head. However, there are a large number of older systems that use a direct current type of read head. In practice it has been discovered that each of these types of read heads have its own particular advantages and disadvantages. For example the direct current read heads have the advantage of being able to read more deeply into the document so that when the ink encoded character is covered by cellophane tape or similar substances the direct current head is still able to read the character. In addition, direct current read heads are quite effective in reading documents that have been creased or folded. On the other hand, direct current read heads are not always able to correctly interpret documents that have correction labels affixed over the original characters since the deep reading characteristics of the head tend to cause it to also react to the character inscribed underneath thereby causing misreads. In addition the direct current read heads are significantly more likely to misread, or substitute characters, due to misprinted or skewed characters on the document than are alternating current read heads.

On the other hand, alternating current read heads have the disadvantage of not being able to read documents that are creased with the same facility as direct current heads nor, due to the fact that they read a shallower field, are they able to read characters that are covered by cellophane tape or the like. The alternating current read heads do, however, have the advantage of having significantly greater overall accuracy in reading characters and thus have a substantially lower reject rate than the direct current read heads. It is this improved rejection rate that has led to the use of alternating current read heads on most of the newer magnetic character reading devices.

In developing the invention, it was discovered that by utilizing both an alternating current read head and a direct current read head in the same system that a significantly lower reject rate could be achieved for documents passing through the reading device. One of the principle advantages of the two read head system consists of being able to read a character with one head when the other read head is unable to recognize that particular character. Also in the event that the character read by each of the heads does not agree, it is possible to either select the character identified by the head with the greatest overall accuracy, generally the alternating current read head, and to use that as the identified character or to insert a reject character in place of the identified characters. By utilizing these two different reading techniques, in a magnetic ink character recognition system it is possible to significantly reduce the rejection rate of documents passing through the system.

In the prior art, there have been incidences of the use of more than one read head for sensing the same character in a magnetic ink character recognition system, specifically U.S. Pat. No. 3,629,822, where each character is read by two heads at the same time in order to get an improved signal identifying that character. But the prior art does not show the use of two separate read heads that utilize two entirely different reading techniques, i.e. alternating current and direct current, to make two separate readings of each character and to logically compare the results.

SUMMARY OF THE INVENTION

It is accordingly an important object of the invention to provide an improved method of and means for increasing the accuracy of character recognition systems.

It is another object of the invention to provide novel logic circuitry for detecting and comparing the output of character read devices employing different character recognition techniques.

It is an additional object of the invention to utilize the characteristics of two different transducing techniques for improving the machine reading of characters and thereby reducing the rejection rate of characters incapable of being read by either technique.

A still further important object of the invention is to provide an improved logic circuit for comparing successive characters in similar bit form and for making logic decisions based on the relative relationships between the two sets of characters.

In a preferred form of a character recognition system embodying the present invention, the document to be read will first pass under a magnetic read head capable of producing signals in response to direct current magnetically encoded characters. This would be the first read device. The direct current read head and associated circuitry converts the waveforms picked up by the read head into a multi-bit binary representation of the DC character and then transfers the representations to a DC character storage unit, a random access memory, under the control of a memory write control circuit. Each character on the document is thus read in turn and written in sequence into the DC character storage unit.

The document then passes under a second read head capable of producing signals generated by alternating current magnetically encoded characters. This would be the second read device. Associated logic circuitry converts the signal generated by each such AC impressed character into a multi-bit binary representation of the character. This multi-bit representation is then transferred to a comparison logic circuit where it is compared with the multi-bit representation produced by the DC read head and associated circuitry for the same character on the document.

Although the illustrated embodiment of the invention first reads the direct current form of encoded characters before reading the alternating current form of the same encoded characters, it is understood that the order of the readings of the encoded characters may be reversed with the result that the alternating current magnetically impressed characters will be read before the same characters in direct current magnetically impressed form are read. Also, it is well within the scope of this invention to use techniques other than magnetically encoded character reading equipment to read characters on a document. For example, this invention can be applied to an optical character reading system where two different types of scanning are used.

More specifically, as each character passes underneath the AC read head, an AC pulse is generated as signified by P(AC). The P(AC) pulse is applied to the read control circuitry for the DC character storage unit and will thus cause the corresponding DC character to be read out of the memory and into the comparison logic. Under control of the comparison logic timing circuit the "first character" read by the AC head and by the DC head are stored in a set of registers in the comparison logic. Then the "second character" as read by the AC head will be applied to the comparison logic along with the multi-bit representation of the corresponding DC character from the DC character storage unit. Thus it may be seen that two characters, each represented by two multi-bit characters, are examined simultaneously so that it may be determined whether two rejects appear in succession on either of the read heads. A reject is defined as a character that was not successfully decoded by the read head and such is represented by all 1's in the multi-bit character representation. If in fact two rejects do appear on either of the read heads in succession then that particular read head is shut down for the remainder of the document and readings will only be taken from the other read head.

The comparison logic also compares each of the two corresponding characters of the first character to determine if they are the same. If they are the same, and not reject characters, then the representation of that particular character will be transmitted to an output register. If, on the other hand, neither of the representations of the first character is a reject but they are unequal and both the second characters are the same (equal) and not rejects the logic circuitry will transmit a reject character to the output register. In the event that the AC and DC representation of the first character are unequal and one is a reject character then the non-reject character will be transmitted to the output register. Of course, in the case where both the AC and the DC representations of the first character are reject characters the reject character will be transmitted to the output register.

In addition to the above mentioned circuits, the system also contains a time-out counter. The time-out counter is responsive to the P(AC) signal and will generate a "single send signal" (SSS) if another P(AC) signal is not received within 1½ times the normal character read time. When the SSS signal is generated it is an indication that the last character on the document, or the last character of a group of characters on the document, has been read by the AC head and the character resident in the output register should be sent to the rest of the system. The SSS signal also conditions the comparison logic timing circuitry for the reception of the first of a new group of characters so that the contents of the output register is not sent to the rest of the system as the first character is being read into the comparison logic.

BRIEF DESCRIPTION OF THE DRAWINGS

FIG. 7 is a timing chart illustrating various signals within the system.

DETAILED DESCRIPTION OF THE INVENTION

Figure 1:
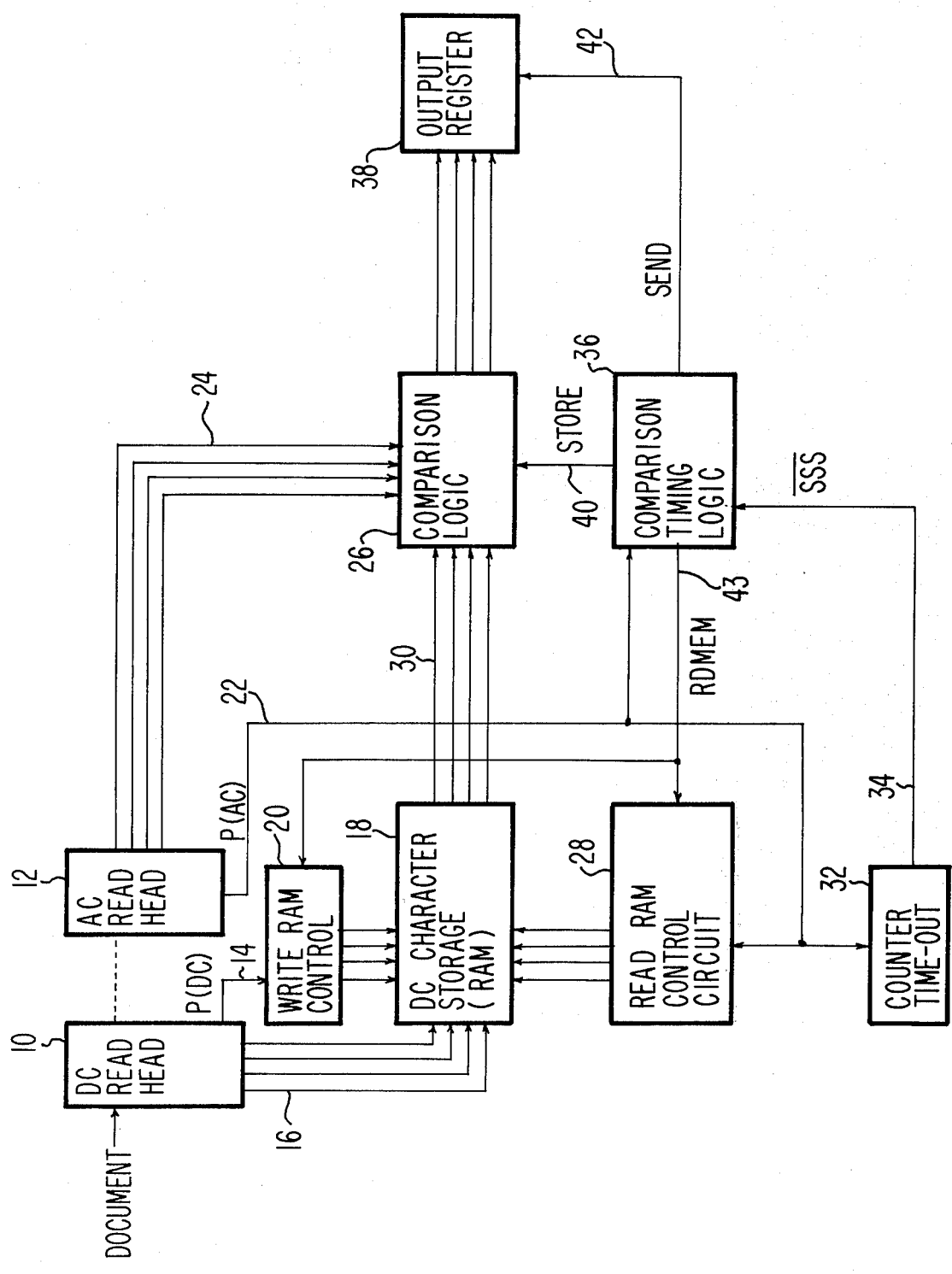
FIG. 1 is an overall block diagram of the double read head system.

In order to gain a general overview of the operation of the double read head system, reference will first be made to the block diagram in FIG. 1. In the preferred embodiment of the invention the document to be read passes from left to right, as indicated by the arrow in the FIG. 1 underneath the DC read head 10 and then under the AC read head 12. As each character that is printed in magnetic ink passes underneath the DC read head 10 a signal P(DC) will be generated on line 14. At the same time, the character is read by the DC read head 10 and decoded by the associated circuitry of the DC read head 10 into a 4 bit "DC character" representation and transmitted by means of lines 16 into the DC character storage unit 18. In the preferred embodiment of the invention, this DC character storage unit 18 is a random access memory (RAM). The signal P(DC) on line 14 causes the write RAM control circuit 20 to write the four bit representation of the DC character on lines 16 into a storage location in the DC character storage unit 18. As each character printed in magnetic ink passes underneath the DC read head 10 the decoded DC character representation is placed in sequence in the DC character storage unit 18.

After the document has passed the DC read head, each of the DC characters read by the DC read head 10 will be stored in sequence in the DC character storage unit 18. It should be noted here that it is not necessary, in the preferred embodiment, that all of the magnetic ink characters be read by the DC read head before any of the characters are read by the AC read head.

In a similar manner, as the document passes under the AC read head 12 each character will be decoded by the logic circuitry associated with the AC read head 12 and converted into the 4 bit "AC character" representation. For purposes of describing the invention, the DC character will refer to a character read and decoded by the DC read head 10 and associated circuitry and the term AC character representation will refer to a character read and decoded by the AC read head 12 and associated circuitry. In addition to decoding each printed character, the AC read head 12 will generate a signal P(AC) on the line 22 for each character read. At the same time, the four bit binary representation of the AC character converted by the associated circuit of the AC read head 12 will be placed on the lines 24 and supplied to the comparison logic component 26.

The P(AC) signals is used as an input to the read RAM control circuit 28 which will in turn cause this circuit to place the corresponding DC character representation on the lines 30 (here the term "corresponding character" refers to the same printed character as read by both the DC read head 10 and the AC read head 12). Therefore, when the first character is read by the AC read head, the four bit representation of the AC character will be placed on lines 24 and at the same time the signal on line 22 P(AC) will cause the read RAM control circuit 28 to retrieve the first character read by the DC read head 10 from the DC character storage 18 and place the four bit representation of the DC character on lines 30. As a result, the comparison logic 26 will have as an input, at any given time, the corresponding AC representation and DC representation of a single character.

The P(AC) signal on line 22 also triggers a time-out counter 32 which generates an $\overline{SSS}$ signal on line 34 when, in the preferred embodiment, a time of 1½ characters has passed without a new signal P(AC) being received from the AC read head 12. The purpose of the counter 32 and its output, the $\overline{SSS}$ signal is to indicate when the last character, or when the last in a group of characters, on a document has been read by the AC read head 12.

In addition to triggering the time-out counter 32, the P(AC) signal on line 22 also triggers the comparison timing logic 36. The comparison timing logic 36 has two functions, the first of which is to cause the registers in the comparison logic 26 to store the AC character representation and the corresponding DC character representation and secondly, to cause the output register 38 to send its contents to the rest of the system. In terms of the operation, the comparison timing logic 36 will respond to the first P(AC) signal on line 22 by causing the registers in the comparison logic to store the AC character representation received over lines 24 and the DC character representations received over line 30 in the respective registers, and at the same time to inhibit the comparison logic 26 from performing any of the tests on the first characters representations so-received. The receipt by the comparison timing logic 36 of the next P(AC) signal generates another store signal on line 40 and, at the same time, permits the comparison logic 26 to compare the AC and DC character representations stored in the comparison logic registers with each other and with the second AC and DC character representations resident on lines 24 and 30 respectively. In addition the comparison timing logic 36 will transmit a SEND signal on line 42 to the output register 38 thereby permitting the contents of the output register to be transmitted to the rest of the system. When the time-out counter 32 has detected the last character on the document, the $\overline{SSS}$ signal on line 34 will combine with the previous information stored in the comparison timing logic 36 to generate another SEND signal on line 42 so that the last character present in the output register 38 may be transmitted to the rest of the system.

In discussing in detail the circuits of the preferred embodiment of the present invention, a detailed explanation of the operation of the DC read head and the AC read head will be given, even though both techniques separately are old in the art. With respect to the DC read head and associated circuitry 10 of FIG. 1, the logic diagram of FIG. 2 illustrates the operation of this circuitry. The direct current method of reading magnetic ink characters has been in commercial use for many years, a typical example being the Burroughs B100 Sorter-Reader for sorting and reading bank checks.

In a DC read system a magnetic field is applied by biasing magnetic write (not shown) to the character before the character passes under the DC read head 44 of FIG. 2. Since each of the 14 printed characters has a different shape, and, of course, therefore a different magnetic flux configuration, each character will generate a different voltage waveform in the read head as the character passes underneath. The characteristic waveform for the character is then stored in the waveform storage device 46 which in the Burroughs B100 system cited above comprises a delay line made up of seven delay segments in series. In identifying the waveform stored in the waveform storage device a separate circuit is employed to interrogate and identify each of the 14 waveforms that represent individual characters. Each of these identification circuits 48, 50, 52 and 54 will have as an input seven taps 56, each from one of the delay segments in the waveform storage device 46. As an example, the "0" identification circuit 48 will monitor the delay line taps 56 wherein the voltage peaks for the "0" waveform should appear on taps 0, 1, 6 and 7. Assume, for the purpose of explanation, that the "0" is the only waveform having peaks at these taps. Then, it can be safely assumed that any time peaks of the correct polarity and amplitude occur only at these taps, it must be the waveform generated by the magnetic character "0". The remaining 13 waveform identification circuits function in a similar manner. Each monitors the delay line taps where the peaks of its particular characters waveform should occur. Therefore, when any one identification circuit has the correct polarity and amplitude peak at this particular monitor point, the assumption is made that this specific waveform must have been generated by the character associated with this waveform. When one of the waveform identification circuits 48, 50, 52 or 54 identifies a character it will signal its associated switching circuit 56, 58, 60 and 62 which will in turn generate in the character storage register 64 the 4 bit binary representation of the identified character. This 4 bit binary representation will then be made available on the output lines 16 which are used as input to the DC character storage unit 18 as shown in FIG. 1.

Figure 2:
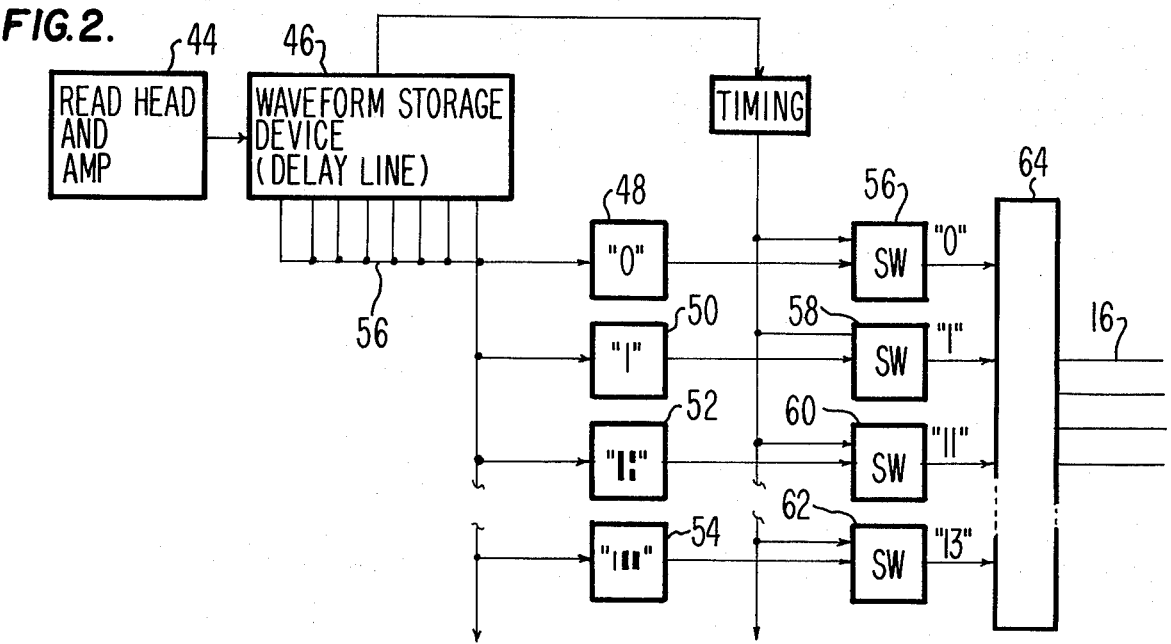
FIG. 2 is a block diagram of the direct current read head and associated circuitry.
Figure 3:
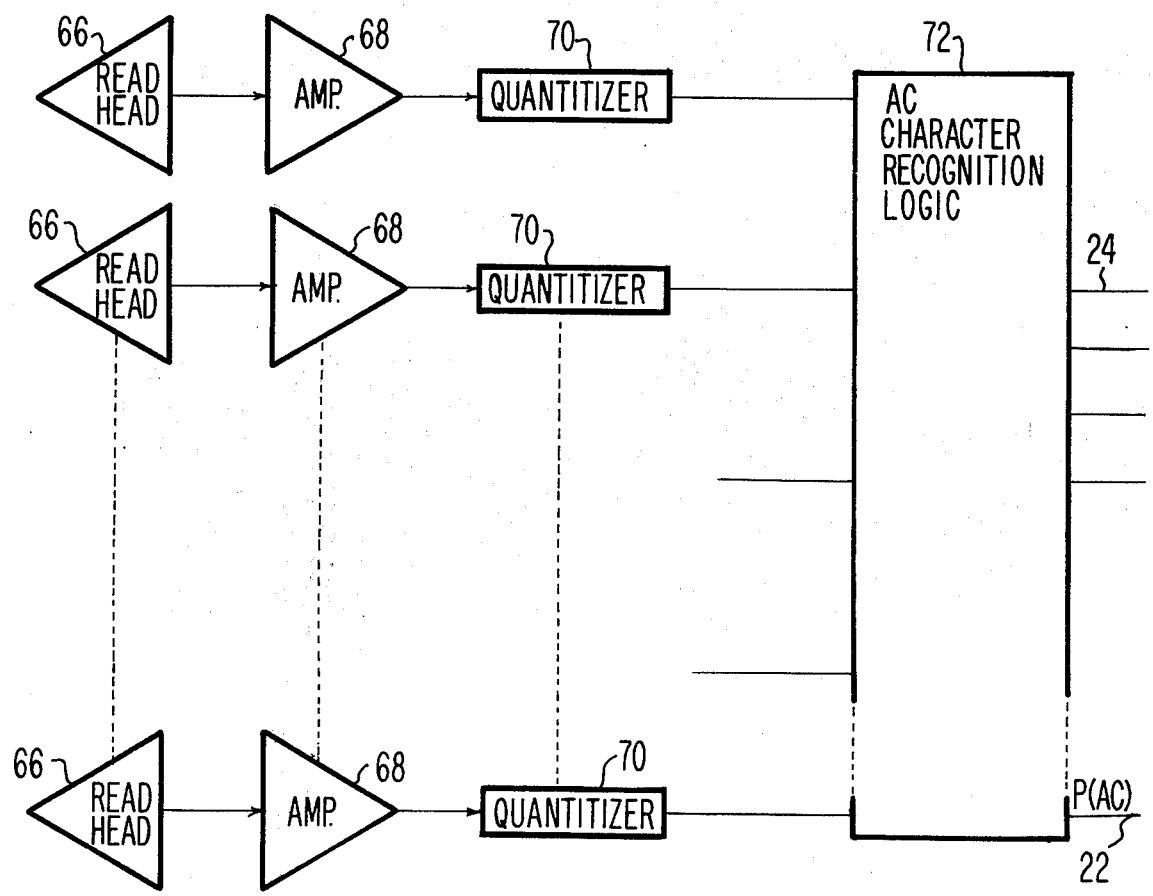
FIG. 3 is a block diagram of the alternating current read head and associated circuitry.

The AC read head and associated circuitry 12 of FIG. 1 works on an entirely different principle than the DC read head. Before the character printed in magnetic ink passes under the AC read head 66 of FIG. 3, a write circuit (not shown) places a sine wave onto the MICR characters at a frequency sufficient to apply approximately seven sine waves on each character. As shown in the block diagram of FIG. 3, there are, in the preferred embodiment, 30 read heads 66 and associated circuitry that will each read portions of the character and reduce it into 10 channel signals. The read head system shown in FIG. 3 may be similar to that shown in U.S. Pat. No. 3,668,634 as used in the Burroughs B9134-1 Character Recognition System and the read head per se may be similar to the multiple transducing read head described in U.S. Pat. No. 3,758,727 which employs a plurality of parallel arranged electromagnetic transducers for reading different portions of the same character. The signals as read by the read heads 66 are then transmitted to amplifying circuits 68 wherein the signals generated in the read head are amplified. The signals so amplified are then transmitted to quantizers 70 which are circuits that perform a quantative analysis on the signals received from the amplifiers 68. Signals from the quantizers are subsequently transmitted to the AC character recognition logic 72 and converted into a four bit binary representation of the read AC character which is in turn placed on the output lines 24. In addition, as each character is read, a pulse will be generated by the character recognition logic on line 22 this pulse being the P(AC) signal. The character recognition logic 72 functions essentially by comparing various features of the characters with sets of stored features and a character will be identified if sufficient features exist for that given character. In the event that the character read is not recognized by the character recognition logic 72 this circuit will place the reject character signal (1,1,1,1) on the lines 24. It may therefore be seen that the AC read head 12, as diagramed in FIG. 3, functions in entirely different ways from the DC read head 10 thereby providing two entirely different approaches for reading the same magnetic ink character.

Figure 4:
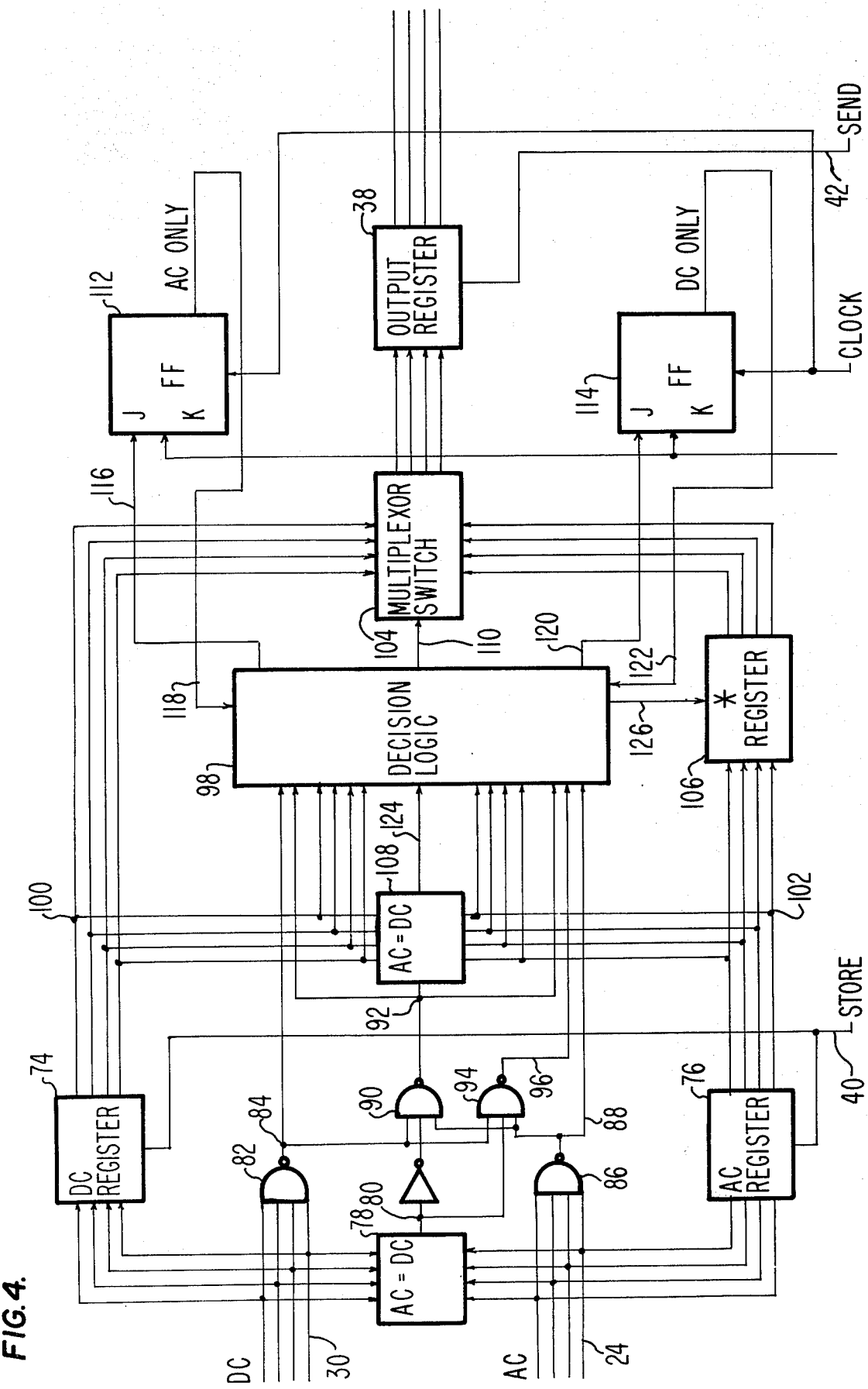
FIG. 4 is a schematic diagram of the comparison logic circuitry.

In describing the comparison logic circuitry within the block 26 of FIG. 1 reference will be made to the schematic diagram that is set forth in FIG. 4. When the first magnetic ink character is read by the AC read head 12 the binary representation of that character will be placed on lines 24 and, as previously described, the corresponding DC character will be read out of the DC character representation storage unit 18 and placed on lines 30. Since this is the first character on the document or the first of a group of characters on a document, the comparison timing logic 36 will not transmit a SEND signal on line 42 thereby preventing the contents of the output register 38 from being transmitted to the remainder of the system. When the next character is read, the 4 bit representation of the DC character and the corresponding AC character will representation be placed on lines 30 and 24, respectively, and the first character will be stored in the DC register 74 and the AC register 76 (FIG. 4).

With respect to the terminology used in this description, the term first character will refer to the character stored in the registers 74 and 76 and the term second character will refer to the character resident on lines 24 and 30. The first character is, therefore, not necessarily the first character on the document.

At this point it is possible to compare the first two characters that have been read by the AC and DC heads due to the fact that the first character will be stored in the registers 74 and 76 and the second character will be resident on the lines 30 and 24. Referring first to the test performed on the second character, the comparison circuit 78 will generate a high signal on line 80 if the two second characters are equal, i.e. their 4 bit representations match. The NAND gate 82 will produce a low signal on line 84 if the second DC character is a reject character, i.e. consist of all ones. Similarly the NAND gate 86 will produce a low signal on line 88 if the second AC character is a reject. The NAND gate 90 will produce a low signal on line 92 if the second characters are unequal where neither of them is reject character. In a similar manner the NAND gate 94 will produce a low signal on line 96 if the second characters are equal and neither of the characters is a reject. It is the signals on these lines 84, 88, 92, and 96 that indicate to the decision logic 98 the status of the second character.

The first character is contained in the DC register 74 and the AC register 76. These two registers will apply the four bit representations of the DC and the AC characters, respectively, on the buses 100 and 102 which serve as inputs to: the decision logic 98, a multiplexor switch 104, a reject register 106 and a comparator circuit 108.

The multiplexor switch 104 performs the basic function of selecting as input to the output register 38 either the DC character from the register 74 or the AC character from the register 76. The multiplexor functions in response to a signal over line 110 from the decision logic 98. When the signal on line 110 is high the multiplexor switch 104 will output the AC character to the output register and when it is low the multiplexor switch will select the DC character for input to the output register 38. Once the tests have been performed by the various elements of the comparison logic circuitry 26 and more particularly the decision logic 98, a signal will be generated on line 110 which will in effect determine which character will be utilized as the reading of the system as a whole.

Also illustrated in FIG. 4 are flip flops 112 and 114 which have as their primary function the conditioning of the comparison logic circuitry 26 so that only readings from the DC head 10 or the AC head 12 may, under certain circumstances, be accepted as output of the system. The first flip flop 112 (AC only) responds to a signal from the decision logic over line 116 which indicates that the DC read head has generated two reject characters in a row. At this point the flip flop 112 will be set thereby producing an "AC only" signal on line 118. The AC only signal on line 118 is then utilized as an input signal to the decision logic 98 which will, as explained in the detailed description of the decision logic, serve to lock out the DC head for the remaining characters on a document. The second flip flop (DC only) 114 operates in a similar manner from a set signal received on line 120 from the decision logic 98 indicating that two consecutive reject characters have been generated by the AC read head 12. When this flip flop has been set, a DC ONLY signal will be generated on line 122 which in a similar manner will cause the decision logic 98 to produce a low signal on line 110 thereby causing the multiplexor switch 104 to only transmit readings from the DC register 74 to the output register 38.

As has been noted before, the comparator circuit 108 accepts inputs from the DC bus 100 and the AC bus 102. This comparator circuit 108 generates a high signal on line 124 indicating that the contents of the DC register 74 and the AC register 76 are the same when they are in fact equal. This has the effect of comparing the two representations of the first character for equality and such occurrence is utilized as an input signal over line 124 to decision logic 98.

The reject register 106 as shown in FIG. 4 has the function of inserting a reject character (1,1,1,1) into the AC bus 102 in response to a signal over line 126 from the decision logic 98. When it is necessary to insert a reject character, as determined by the decision logic 98, it will become in effect the output of the AC register as transmitted to the multiplexor switch 104. In the preferred embodiment of the invention, the decision logic will have at that time caused the multiplexor switch 104 to accept as input to the output register 38 the reading, in this case the reject character, from the AC head. The purpose of inserting a reject character into the output register 38 is to provide for the case, as determined by the decision logic, when the readings of the AC head and the DC head do not correspond in such a manner as it can be confidently assumed that either head has read a valid character.

Figure 5:
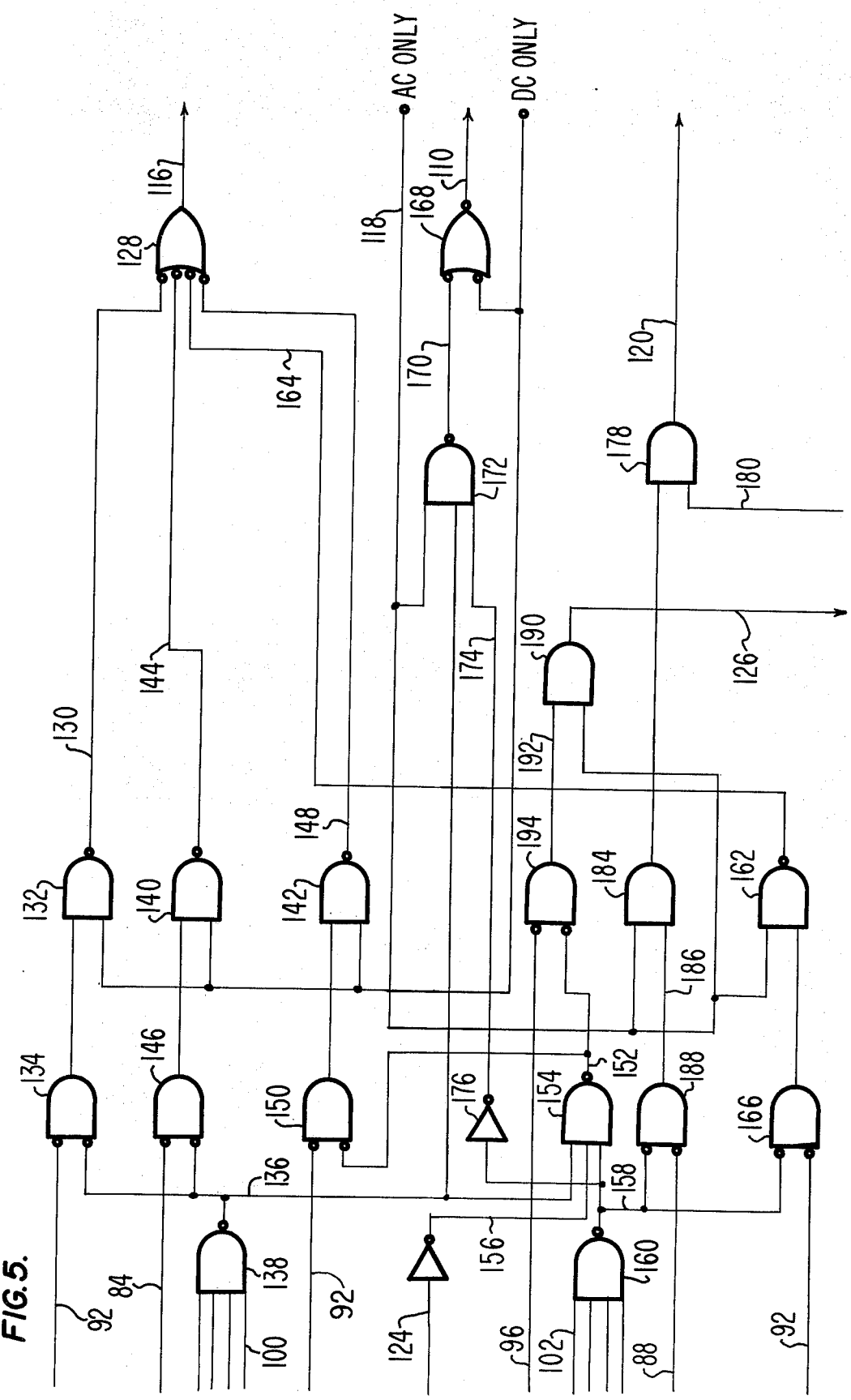
FIG. 5 is a schematic diagram of the decision logic circuitry contained within the comparison logic.

In examining the decision logic 98 in detail with reference to the logic circuit shown in FIG. 5, it may be useful to identify each of the input lines thereto and the state of the system that they represent. This is provided in Table A below:

TABLE A

| Line | State | Condition |
|---|---|---|
| 92 | L | "second characters" ≠ but neither reject |
| 84 | L | "second DC character" reject |
| 96 | L | "second characters" = neither reject |
| 88 | L | "second AC character" reject |
| 124 | H | "first characters" = |
| 118 | L | AC only |
| 122 | L | DC only |

In describing the preferred embodiment of the decision logic of block 98 of FIG. 4, the details of which are illustrated in FIG. 5, the discussion will generally start with the output elements and work back to the inputs to the decision logic as shown in Table A. Starting with the gate 128, this gate generates a signal on line 116 which, as shown in FIG. 4, is coupled to the SET input of the AC only flip flop 112. When a high signal is generated by the gate 128 on line 116 the effect will be to set the AC only flip flop 112 thus having the result of locking out the DC read head and only accepting AC characters from the system. The first input to the gate 128 is over line 130 is from the NAND gate 132. When the NAND gate 132 produces a low signal on line 130 this will represent the condition wherein the first DC character is a reject and the second character is a substitution (i.e. the DC character is unequal to the AC character). This result is readily apparent since the gate 134 will respond to the signal on line 92 and the signal on line 136 which will be low when the first DC character is a reject as determined by the NAND gate 138. Thus it may be seen that in the circumstances wherein the first DC character is a reject and there is a substitution in the second character the gate 128 will pass a high signal and cause the AC only flip flop 112 of FIG. 4 to set. At this point it might be appropriate to indicate that when the AC only flip flop 112 is set there will be a low signal on the AC only line 118. In the corresponding situation, when the DC only flip flop 114 of FIG. 4 is set there will be a low signal on line 122. When the DC only flip flop 114 is in a reset condition, there will be a high signal on line 122 thus enabling the NAND gate 132 as well as the NAND gates 140 and 142 so that the AC only flip flop 112 may be set via the NOR gate 128. This likewise, serves the function of preventing the AC only flip flop to be set while the DC only flip flop is set.

The gate 128 will also generate a high signal on line 116 when the NAND gate 140 produces a low signal on line 144 thereby indicating the condition that both the first DC character and the second DC character are rejects. Here, the NAND gate 140 responds to the NOR gate 146 which in turn has an input from line 84, indicating the second DC character is a reject, and an input from the NAND gate 138 that indicates when the first DC character is a reject.

The gate 128 will also produce a high signal in response to the NAND gate 142 over line 148 which indicates that there are two consecutive substitutions. The NAND gate 142 responds to the gate 150 which in turn responds to line 92, where the second character is a substitution, and a low signal on the line 152 indicating that the first character is a substitution. The signal on line 152 is generated by the NAND gate 154 which in turn responds to a high signal on line 136, indicating that the first DC character is not a reject, the high signal on line 156 which is the inverse of the low signal on line 124, indicating that the first characters are unequal, and the high signal on line 158 from the NAND gate 160 which indicates that the first AC character is not a reject.

The gate 128 will also produce a high signal when the NAND gate 162 produces a low signal on line 164. When NAND gate 162 produces a low signal on line 164, this indicates the condition that the first AC character is a reject and the second character is a substitution. The NAND gate 162 responds to the signal produced by the gate 166 which in turn responds to the signal on line 158, explained in the above paragraph, and the input signal on line 92. The NAND gate 162 is also enabled by the AC only signal on line 118 so that when the AC only flip flop 112 of FIG. 4 is set another setting signal will not be generated by the gate 128.

One of the primary outputs of the decision logic 98 is the output on line 110 to the multiplexor switch 104. When the signal on line 110 is low the multiplexor switch 104 will transfer the DC character on bus 100 to the output register 38 and when the signal on line 110 is high the AC character on bus 102 will be transmitted to the output register 38. The first element that effects the operation of the multiplexor switch 104 is the gate 168 of FIG. 5. The first input to the gate 168 is the signal on line 122 that represents DC only operation. The second input to gate 168 over line 170 is generated by the NAND gate 172. If one or more of the inputs 118, 136, or 174 are low the output of gate NAND 172 will be high thus causing a high signal on line 110 which in effect means that the first AC character will be transmitted to the output register.

The conditions under which the NAND gate 172 will provide what is in effect an AC character read are briefly summarized. A low signal on line 118 indicates that the AC only flip flop 112 has been set and a low signal on line 136 indicates that the first DC character is a reject. A low signal on line 174 is the result of inverting by means of the amplifier 176 the signal from the NAND gate 160 thereby indicating that there is a valid first AC character.

The DC only flip flop 114 shown in FIG. 4 is set by the signal on line 120 which in return is responsive to the AND gate 178. The DC only flip flop 114 may be disabled by placing a low signal on line 180 thereby giving the capability to manually select which head will be doing the reading. The AND gate 178 also responds to AND gate 184. The AND gate 184 will generate a high signal when it is desired to set the DC only flip flop 114. The first input to the AND gate 184 is the AC only input on line 118 which has the effect of locking out the DC only flip flop 114 when the AC only flip flop 112 is set. The other input to the AND gate 184 is taken from lead 186 which is connected to the output of gate 188. The gate 188 responds to the NAND gate 160 producing a low signal when the first AC character is a reject and the gate 188 also responds to a low signal on line 88 indicating that the second AC character is a reject. It may therefore be apparent that the DC only flip flop will be set when two consecutive AC characters are rejects.

The last output of the decision logic as illustrated in FIG. 5 is the output on line 126 to the reject register 106 of FIG. 4. A high signal on line 126 will have the effect of inserting a reject character into the AC character bus 102. The high signal will be placed on line 126 when the AND gate 190 receives a high signal on both line 118 and line 192. A high signal on line 118 indicates that the AC only flip flop 112 has not been set. The signal on line 192 is generated by the NAND gate 194 which in turn responds to the low signal on line 96, representing the condition of a valid second character, and the signal on line 152 representing the condition of a substitution in the first character as previously explained. The net result will be the insertion of a reject character on the AC bus 182 when the first character is a substitution and the second character is valid. The reason for inserting a reject character into the output register at this point in the preferred embodiment has to do with the fact that it is not certain as to which representation, the AC or the DC, has been read correctly where the second character is valid thereby giving no indication as to a pattern of errors in the read system. Given the above conditions it is considered best, in the preferred embodiment, to reject the reading and since the system would tend to accept the AC reading, it is necessary to force it to accept a reject character.

The final portion of the circuitry of the preferred embodiment of the invention is the comparison timing logic 36 of FIG. 1. The comparison timing logic for which the detailed schematic is presented in FIG. 6, will be discussed in conjunction with the timing chart or diagram shown in FIG. 7. The inputs to the comparison timing logic include the P(AC) signal 22, the clock 196 and the SSS (time-out) signal 34. When the first P(AC) signal is received, indicating the first character on the document, the flip flops 198 and 200 will set and reset so as to cause both of the inputs to the gate 202 to go low thereby generating a pulse on the RDMEM line 43. A RDMEM signal on line 43 will cause the READ RAM CONTROL circuit 28 of FIG. 1 to produce the corresponding DC character on lines 30. The output of these two flip flops 198 and 200 are also combined in the gate 204 so as to cooperate with the clock pulse in the AND gate 206 to generate the store signal on line 40. This will have the effect of storing the first character in the DC register 74 and the AC register 76 as shown in FIG. 4.

Since it is just the first, first character that has been received into the comparison logic 26 of FIG. 1 it is important that the contents of the output register 38 not be sent to the system nor the various flip flops in the comparison logic be set or reset as though a test were being performed on two consecutive characters on the same document. Therefore the outputs of the gate 204 and the AND gate 206 for the first character will set the flip flop 208, which had been reset at the end of the previous document using SSS or by means of line 210 which is start of document. A low value on line 212 will operate to prevent the clock pulses from being transmitted through gate 214 on line 216 to enable the AC only flip flop 112 and the DC only flip flop 114 of FIG. 4. By the same token the low value on line 212 serves to disable the NAND gate 218 thereby preventing the SEND signal from being sent over line 42 to the output register 38 of FIG. 1. These effects are illustrated for the first character in FIG. 7 since the TEST line and the SEND line do not show any pulses for the FIRST CHARACTER.

Figure 6:
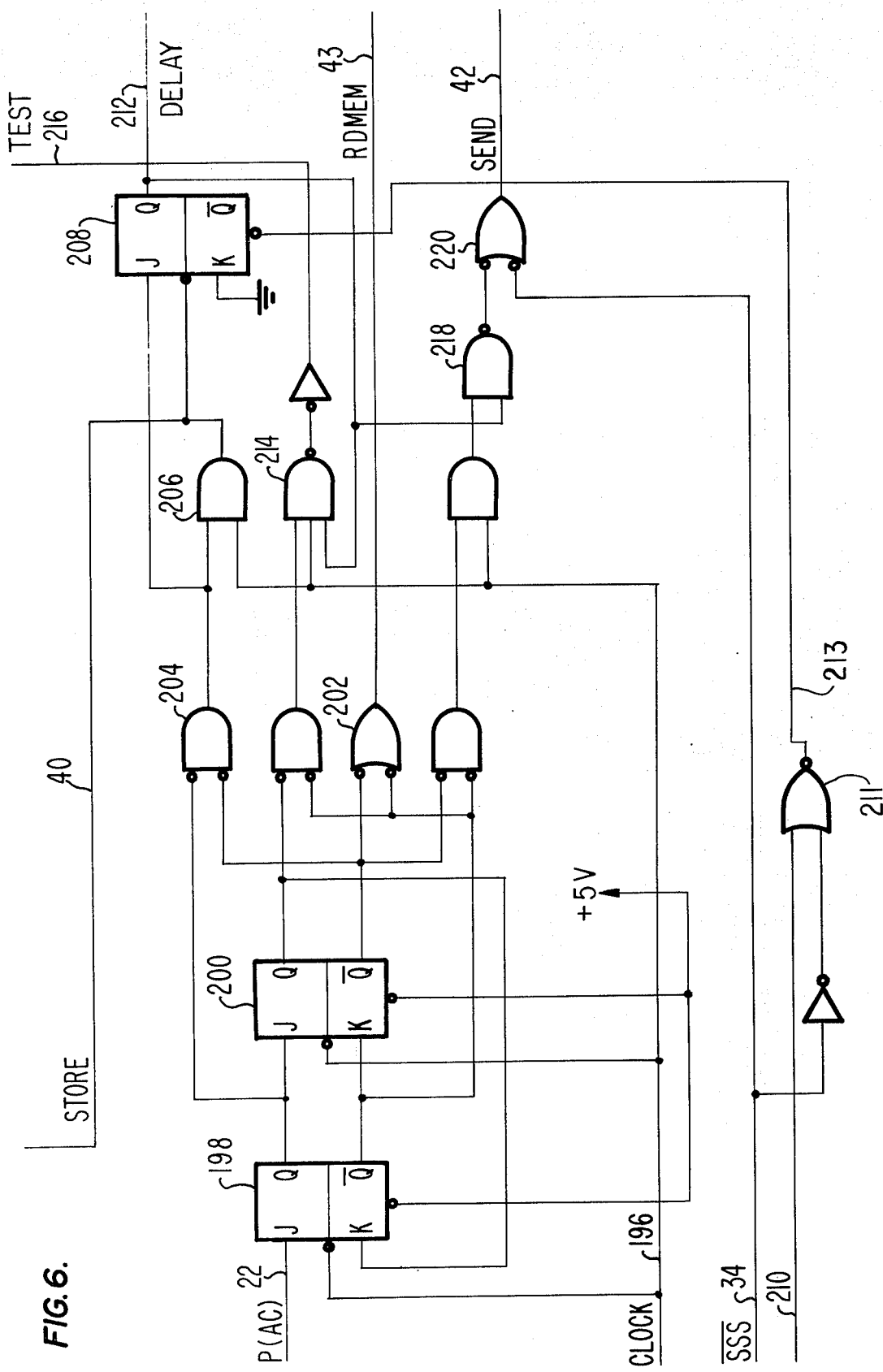
FIG. 6 is a schematic diagram of the comparison timing locic.

When the SECOND CHARACTER is read by the AC read head, the P(AC) pulse on line 22 will have a somewhat different effect on the circuitry of FIG. 6. The principle difference concerns the fact that the flip flop 208 will now be set thereby enabling the NAND gate 214 and the NAND gate 218 so that the comparison logic may perform the test on the two characters being stored in the comparison logic and the send signal on line 42 may be transmitted.

After a predetermined amount of time between pulses, P(AC), the time-out counter 32, as previously described, will produce the SSS pulse on line 34 that serves to indicate that the last character on the document has been read. This pulse is then transmitted through gate 220 of FIG. 6 thereby generating a SEND pulse on line 42 as indicated in the timing diagram in FIG. 7. By so generating a pulse after the last character has been read, the transmitting of the last character from the output register 38 to the system as a whole is assured.

The foregoing has been a description of the preferred embodiment of the invention, but it will be obvious to those skilled in the art that many modifications and alterations may be made to the preferred embodiment and still fall within the scope of the invention as claimed. For example using read heads that function on principles other than the direct current read head or alternating current read head certainly falls within the broad concept of the invention. Also having the document read by the AC read head first and having that character stored in the storage unit rather than the DC character is certainly within the inventive concepts herein presented.

What is claimed is:

1. In a method of reading characters which includes the steps of reading each character with a first reading means and again reading each character with a second independent and different reading means, the improvement comprising the steps of:

storing two interpretations of a first character, the first interpretation as read by said first reading means and the second interpretation as read by said second reading means;

providing two interpretations of a second character, the first interpretation as read by said first reading means and the second interpretation as read by said second reading means;

selecting for output the first interpretation of said first character if both interpretations of said first character are the same;

selecting a non-reject interpretation of said first character for output when the other interpretation of said first character is a reject character;

outputting a reject character when both interpretations of said first character are reject characters;

selecting only characters from said first reading means when the second interpretation of said first character and of said second character are both reject characters;

selecting only characters from said second reading means when the first interpretation of said first character and of said second character are both reject characters; and outputting a reject character where the interpretations of said first character are not equal, but where neither is a reject character, and where both interpretations of said second character are equal and not reject characters.

2. In a character reading system having a first reading means and a second independent and different reading means for reading characters, the improvement comprising:

a first register means for temporarily storing the first character read by said first reading means;

a second register means for temporarily storing the corresponding first character read by said second reading means;

first input means for receiving the next successive character read by said first reading means;

second input means for receiving the corresponding next successive character read by said second reading means;

a first comparison logic means coupled to said first and second register means for comparing the first character read by said first reading means with the corresponding first character read by said second reading means;

a second comparison logic means coupled to said first and second input means for comparing the next successive character read by said first reading means and the corresponding next successive character read by said second reading means; and decision logic circuit means responsive to said first and second register means, to said first and second input means, and to said first and second comparison logic means for determining whether the first character read by said first reading means or the corresponding first character read by said second reading means is more likely to be a valid character.

3. The character reading system of claim 2 which further includes:

switching means responsive to said decision logic circuit means for selecting the output of said first register means when it is determined that said first character read by said first reading means is more likely to be valid and for selecting the output of said second register means when it is determined that the corresponding first character read by said second reading means is more likely to be valid.

4. The character reading system of claim 3 wherein said decision logic means further includes:

output register means for receiving the selected character from said switching means;

reject insertion means responsive to said decision logic circuit means for inserting a reject character into said switching means when said decision logic circuit means is unable to determine whether the character read by said first reading means or the corresponding character read by said second reading means is more likely to be a valid character;

a first bistable means responsive to an indication by said decision logic circuit means that said first character read by said first reading means will continue to be more likely to be valid than said first character read by said second reading means for insuring that said decision logic circuit means enables said switching means to transfer only the contents of said first register means to said output register means; and a second bistable means responsive to an indication by said decision logic circuit means that said first corresponding characters read by said second reading means will continue to be more likely to be valid than the first character read by said first reading means for insuring that said decision logic circuit means enables said switching means to transfer only the contents of said second register means to said output register means.

5. The character reading system of claim 4 wherein said character reading system further includes:

counter means responsive to the latter of said first and second reading means to sequentially read a character for establishing a predetermined time interval indicative of the fact that said latter reading means has read the last character for generating a signal indicative thereof; and timing logic means for coordinating the operation of said comparison means and said decision logic means, for controlling the transmission of said character selected as valid from said output register means; and being responsive to said signal from said counter means for insuring that the last character passed to said output register means by said switching means is transmitted.

6. A magnetic ink character reading system comprising:

first direct current reading means for reading characters printed in magnetic ink;

second alternating current reading means for reading characters printed in magnetic ink;

storage means for storing the characters read by said first direct current reading means; and logic means responsive to said storage means and to said second alternating current reading means for evaluating the relative validity of the character read by said first direct current reading means and the corresponding character read by said second alternating current reading means.

7. The magnetic ink character reading system of claim 6 wherein said first direct current reading means includes a direct current read head and associated circuitry and said second alternating current reading means includes an alternating current read head and associated circuitry.

8. The magnetic ink character reading system of claim 6 wherein said storage means includes:

a random access memory;

a write control circuit means responsive to said first direct current reading means for writing the characters read by said first direct current reading means into said random access memory; and a read control circuit means responsive to said second alternating current reading means and said logic means for reading said corresponding characters out of said random access memory.

9. The magnetic ink character reading system of claim 6 wherein said logic means includes:

a first register for storing the character read by said second alternating current reading means;

a second register for storing the corresponding character read by said first direct current reading means;

first input means for receiving the next successive character read by said first direct current reading means;

second input means for receiving the next successive character read by said second alternating current reading means;

a first comparison circuit means for comparing the first character read by said first direct current reading means and the corresponding first character read by said second alternating current reading means;

a second comparison circuit means for comparing the next successive character read by said first direct current reading means and the corresponding next successive character read by said second alternating current reading means;

a decision logic circuit means responsive to said first register means, said second register means, said first input means, said second input means, said first comparison circuit means, and said second comparison circuit means for evaluating the relative validity of the character read by said first direct current reading means and the corresponding character read by said second alternating current reading means;

switch means responsive to said decision logic circuit means for selecting the output of said first register means or said second register means;

an output register means for receiving the output of said switch means; and reject insertion means responsive to said decision logic circuit means for inserting a reject character into said switch means for transfer to said output register means when said decision logic circuit means determines that neither the character read by said first direct current reading means nor the corresponding character read by said second alternating current reading means is likely to be a valid character.

10. The magnetic ink character reading system of claim 9 wherein said logic means further includes:

a first bistable means responsive to said decision logic circuit means for allowing said switch means to select only the output of said second register means whenever two successive characters read by said second alternating current reading means are reject characters;

a second bistable means responsive to said decision logic circuit means for allowing said switch means to select only the output of said first register means whenever (a) the first character read by said first direct current reading means is a reject character and the next successive carrier read by said first direct current reading means in different from the corresponding next successive character read by said second alternating current reading means, (b) whenever two successive characters read by said first direct current reading means are reject characters, (c) whenever the first character read by said first direct current reading means is different from the first character read by said second alternating current reading means and the next successive character read by said first direct current reading means is different from the corresponding next successive character read by said second alternating current reading means, or (d) the first character read by said second alternating current reading means is a reject character and the next successive character read by said first direct current reading means is different from the corresponding next successive character read by said second alternating current reading means; and wherein said decision logic circuit means further includes means for enabling said switching means to select the output of said first register means whenever (a) the first character read by said first direct current reading means is the same as the corresponding first character read by said second alternating current reading means, (b) the first character read by said first direct current reading means was a reject character, or (c) said second bistable means has been activated and said first bistable means has not.

11. The magnetic ink character reading system of claim 6 additionally including a time-out counter means for indicating to said logic means when said second alternating current reading means has read the last character.

12. A magnetic ink character reading system comprising:

direct current reading means for reading characters printed in magnetic ink;

alternating current reading means for reading characters printed in magnetic ink;

character storage means for storing the characters read by said direct current reading means;

write control circuit means responsive to said direct current reading means for causing said character storage means to store the characters read by said direct current reading means;

a comparison logic circuit means responsive to said alternating current reading means for comparing a character read by said alternating current reading means and the corresponding character read by said direct current reading means;

a read control circuit means responsive to said alternating current reading means for providing to said comparison logic circuit means the corresponding character stored in said character storage means;

a comparison timing logic circuit means responsive to said alternating current reading means for timing the operation of said comparison logic circuit means;

counter means responsive to said alternating current read means for indicating to said comparison timing logic means when the last character has been read by said alternating current reading means; and an output register means responsive to said comparison timing logic means, for receiving the output of said comparison logic circuit means.

13. The magnetic ink character reading system of claim 12 wherein said comparison logic circuit means includes:

decision logic circuit means for determining the likelihood that said first character read by said direct current reading means is valid and for determining the likelihood that the corresponding first character read by said alternating current reading means is valid;

reject insertion means for inserting a reject character into said output register means whenever said decision logic means is unable to establish the validity of either said character read by said direct current reading means or said corresponding character read by said alternating current reading means;

an AC ONLY flip flop means responsive to an indication from said decision logic circuit means that the characters read by said alternating current reading means are more likely to be valid than the corresponding characters read by said direct current reading means for generating a first control signal for enabling said comparison logic means to accept only the characters read by said alternating current reading means for transmission to said output register means; and a DC ONLY flip flop means responsive to an indication from said decision logic circuit means that the characters read by said DC reading means are more likely to be valid than the corresponding characters read by said alternating current reading means for generating a second control signal for enabling said comparison logic circuit means to accept only the characters read by said direct current reading means.

14. A magnetic ink character reading system comprising:
  first reading means for reading magnetic ink characters previously subjected to one form of a common magnetic field encoding, and for producing a waveform characteristic of each such character so read;
  second reading means for subsequently reading the same magnetic ink characters as read by the first reading means but previously subjected to a different form of a common magnetic field encoding, and for producing a waveform characteristic of each such character so read;
  means for converting the waveforms of each of the same characters read by said first and said second reading means into multi-bit binary representations thereof;
  means for comparing the multi-bit binary representations produced by said first and said second reading means corresponding to the same characters; and
  logic means responsive to said converting means and to said comparison means for accepting or rejecting the validity of the characters read by said first reading means and the characters read by said second reading means.

15. The magnetic ink character reading system of claim 14 wherein there is also provided:
  storage means for storing said multi-bit binary representations of magnetic ink characters;
  control circuit means responsive to the reading of a character by said first reading means for storing the multi-bit binary representation thereof into said storage means; and
  second control circuit means responsive to the reading of the same character by said second reading means for withdrawing the multi-bit binary representation thereof from said storage means and delivering the same to said comparing means.

16. The magnetic ink character reading system of claim 15 wherein said logic means includes:
  first logic circuit means responsive to said comparison means for selecting the character read by said first reading means when said comparison means indicates that it is likely that both said first and said second reading means have identified a valid character;
  second logic circuit means for indicating the likelihood that neither said first reading means nor said second reading means have identified a valid character;
  third logic circuit means for determining whether said first reading means is more likely to be identifying a valid character than said second reading means;
  fourth logic circuit means for determining whether said second reading means is more likely to be identifying a valid character than said first reading means;
  output means for outputting a selected character;
  means responsive to said first logic circuit means for passing the characters read by said first reading means to said output means;
  means responsive to said second logic circuit means for generating a reject character representation and for supplying said reject character representation to said output means;
  means responsive to said third logic circuit means for insuring that only the characters read by said first reading means are supplied to said output means; and
  means responsive to said fourth logic circuit means for insuring that only the characters read by said second reading means are supplied to said output means.

17. A character reading system comprising:
  first reading means for reading characters;
  second reading means for reading characters, said second reading means being independent of and different in structure and operation from said first reading means;
  storage means for storing the characters read by said first reading means, said storage means including a random access memory, a write control circuit means responsive to said first reading means for writing the characters read by said first reading means into said random access memory, and a read control circuit means responsive to said second reading means and to a comparison means for reading corresponding characters out of said random access memory;
  comparison means for comparing characters read by said second reading means with the corresponding characters stored in said storage means; and
  decision logic means responsive to said comparison means for selecting either one of the characters read by said first reading means or the corresponding character read by said second reading means as a valid character.

* * * * *